US012811430B2

(12) United States Patent
Gumino et al.

(10) Patent No.: US 12,811,430 B2
(45) Date of Patent: Nov. 24, 2026

(54) VOLTAGE DISCHARGE DEVICE

(71) Applicant: Richardson Electronics, Ltd., LaFox, IL (US)

(72) Inventors: Brian Christopher Gumino, LaFox, IL (US); Matthew Adomaitis, LaFox, IL (US); John Raymond Curran, LaFox, IL (US); Jeremy Winston Wilks, LaFox, IL (US)

(73) Assignee: Richardson Electronics, Ltd., LaFox, IL (US)

( * ) Notice: Subject to any disclaimer, the term of this patent is extended or adjusted under 35 U.S.C. 154(b) by 651 days.

(21) Appl. No.: 18/476,879

(22) Filed: Sep. 28, 2023

(65) Prior Publication Data

US 2024/0113548 A1 Apr. 4, 2024

Related U.S. Application Data

(60) Provisional application No. 63/411,781, filed on Sep. 30, 2022.

(51) Int. Cl.
*H02J 7/96* (2026.01)
*H02J 7/34* (2006.01)
*H02J 7/84* (2026.01)

(52) U.S. Cl.
CPC ................ *H02J 7/96* (2026.01); *H02J 7/345* (2013.01); *H02J 7/84* (2026.01)

(58) Field of Classification Search
CPC ................. H02J 7/96; H02J 7/345; H02J 7/84
USPC .......................................................... 320/166
See application file for complete search history.

(56) References Cited

U.S. PATENT DOCUMENTS 8,198,870 B2 * 6/2012 Zuercher ................... H02J 7/54 320/167
9,825,340 B2 * 11/2017 Birke .................. H01M 10/488
10,252,629 B2 * 4/2019 Gebhart .................. B60L 50/64
10,797,503 B2 * 10/2020 Rechel .................... H02J 7/345
12,512,666 B2 * 12/2025 Wolf ........................ H02H 7/18 361/93.9
2006/0194102 A1 * 8/2006 Keshishian ........... H01M 50/51 429/7
2008/0150541 A1 * 6/2008 Salman ................ G01R 31/389 324/430
2009/0322289 A1 * 12/2009 Zuercher ................... H02J 7/54 320/167
2013/0009600 A1 * 1/2013 Jeong ....................... B60L 50/40 320/167
2016/0178686 A1 * 6/2016 Janardhan ............ G01R 31/396 324/66
2016/0190845 A1 * 6/2016 Chen ...................... H02H 3/087 320/135

(Continued)

FOREIGN PATENT DOCUMENTS

CN 102666180 A * 9/2012 .............. H02M 1/32
CN 107276203 A * 10/2017 .............. H02J 7/345
CN 115333191 A * 11/2022 .............. H02J 7/933

*Primary Examiner* — M Baye Diao
(74) *Attorney, Agent, or Firm* — Erise IP, P.A.

(57) ABSTRACT

A voltage discharge device configured to drain a voltage of one or more energy storage devices by adaptively adjusting an internal resistance based on a voltage of the one or more energy storage devices. The internal resistance may be selectively adjusted using a plurality of transistors coupled to a resistor coil disposed in the voltage discharge device.

20 Claims, 11 Drawing Sheets

(56) References Cited

U.S. PATENT DOCUMENTS

| | | | | |
|---|---|---|---|---|
| 2018/0366973 | A1* | 12/2018 | Kudo | G05F 3/26 |
| 2022/0359120 | A1* | 11/2022 | Macaluso | B60L 50/40 |

* cited by examiner

VOLTAGE DISCHARGE DEVICE

RELATED APPLICATIONS

This non-provisional patent application claims priority benefit, with regard to all common subject matter, of earlier-filed U.S. Provisional Patent Application No. 63/411,781, filed on Sep. 30, 2022, and entitled "VOLTAGE DISCHARGE DEVICE." The identified earlier-filed provisional patent application is hereby incorporated by reference in its entirety into the present application.

BACKGROUND

1. Field

Embodiments of the present disclosure relate to electrical voltage discharge. More specifically, embodiments of the present disclosure relate to electrical voltage discharge for energy storage modules.

2. Related Art

Energy storage modules such as batteries and ultracapacitors are utilized to provide energy storage for a variety of applications. In some cases, maintenance and other testing procedures may be performed on or near said energy storage modules, for example, within a battery box or other storage compartment of the energy storage modules. In such cases, the energy storage modules may store large amounts of energy. Accordingly, the energy storage modules may be drained prior to performing maintenance and testing operations to enhance safety and reduce damage. However, existing means of voltage reduction rely on unsuitable voltage loads that require large amounts of time to drain the energy storage modules and fail to fully discharge the energy storage modules.

SUMMARY

Embodiments of the present disclosure solve the above-mentioned problems by providing a voltage discharge device capable of selectably adjusting an internal resistance based on a monitored voltage of an energy storage module being discharged.

In some aspects, the techniques described herein relate to a voltage discharge device for reducing a voltage of at least one ultracapacitor energy storage module, the voltage discharge device including: a controller configured to monitor an equivalent series resistance (ESR) of the at least one ultracapacitor energy storage module to thereby determine a life of the at least one ultracapacitor energy storage module; a plurality of electrical terminals electrically coupled to the at least one ultracapacitor energy storage module, the plurality of electrical terminals including two or more Kelvin electrical connections configured to reduce contact resistance while measuring voltage; a shunt resistor configured to measure an incoming current associated with the voltage discharge device; a resistor coil electrically coupled to at least a portion of the plurality of electrical terminals; and one or more field-effect transistors selectively electrically coupled to the resistor coil to thereby selectively adjust a resistance of the resistor coil based on a voltage of the at least one ultracapacitor energy storage module.

In some aspects, the techniques described herein relate to a voltage discharge device, further including: a positive electrical cable attached to a positive electrical terminal of the plurality of electrical terminals, the positive electrical cable configured to electrically couple the positive electrical terminal to the at least one ultracapacitor energy storage module; and a negative electrical cable attached to a negative electrical terminal of the plurality of electrical terminals, the negative electrical cable configured to electrically couple the negative electrical terminal to the at least one ultracapacitor energy storage module.

In some aspects, the techniques described herein relate to a voltage discharge device, further including: one or more fans configured to cool the resistor coil during use, wherein the one or more fans are electrically powered by the voltage of the at least one ultracapacitor energy storage module.

In some aspects, the techniques described herein relate to a voltage discharge device, further including: a voltage divider circuit configured to feedback to the controller to thereby monitor the voltage of the at least one ultracapacitor energy storage module.

In some aspects, the techniques described herein relate to a voltage discharge device, further including: a Bluetooth microcontroller configured to wirelessly communicate with one or more external devices.

In some aspects, the techniques described herein relate to a voltage discharge device, wherein the voltage discharge device is configured to reduce a voltage of the at least one ultracapacitor energy storage module to below 5 volts prior to measuring the ESR of the at least one ultracapacitor energy storage module.

In some aspects, the techniques described herein relate to a voltage discharge device, wherein the voltage discharge device is configured to be coupled to at least one external power source distinct from the at least one ultracapacitor energy storage module.

In some aspects, the techniques described herein relate to a voltage discharge device for reducing a voltage of at least one energy storage module, the voltage discharge device including: a controller configured to monitor an equivalent series resistance (ESR) of the at least one energy storage module to thereby determine a life of the at least one energy storage module; a plurality of electrical terminals electrically coupled to the at least one energy storage module, the plurality of electrical terminals including two or more Kelvin electrical connections configured to reduce contact resistance while measuring voltage; a shunt resistor configured to measure an incoming current associated with the voltage discharge device; a resistor coil electrically coupled to at least a portion of the plurality of electrical terminals; and one or more field-effect transistors selectively electrically coupled to the resistor coil to thereby selectively adjust a resistance of the resistor coil based on a voltage of the at least one energy storage module.

In some aspects, the techniques described herein relate to a voltage discharge device, further including: a user interface unit including: a display; and one or more input actuators.

In some aspects, the techniques described herein relate to a voltage discharge device, wherein the one or more input actuators are configured to receive a user input indicative of a voltage set point and a current set point from a user.

In some aspects, the techniques described herein relate to a voltage discharge device, wherein the controller is programmed to update a voltage and current of the voltage discharge device based on the user input.

In some aspects, the techniques described herein relate to a voltage discharge device, wherein the controller is programmed to perform a discharge operation in which a voltage of the at least one energy storage module is discharged below a predetermined voltage threshold.

In some aspects, the techniques described herein relate to a voltage discharge device, wherein the controller is further programmed to perform a measurement operation in which one or more parameters associated with the at least one energy storage module are measured after the discharge operation.

In some aspects, the techniques described herein relate to a voltage discharge device, wherein the voltage discharge device is configured to reduce a voltage of the at least one energy storage module to below 5 volts prior to measuring the ESR of the at least one energy storage module.

In some aspects, the techniques described herein relate to a voltage discharge system including: a protective housing; and a voltage discharge device disposed in the protective housing and configured to be coupled to at least one energy storage module for monitoring the at least one energy storage module, the voltage discharge device including: a controller configured to monitor an equivalent series resistance (ESR) of the at least one energy storage module to thereby determine a life of the at least one energy storage module; a plurality of electrical terminals electrically coupled to the at least one energy storage module, the plurality of electrical terminals including two or more Kelvin electrical connections configured to reduce contact resistance while measuring voltage; a resistor coil electrically coupled to at least a portion of the plurality of electrical terminals; and one or more field-effect transistors selectively electrically coupled to the resistor coil to thereby selectively adjust a resistance of the resistor coil based on a voltage of the at least one energy storage module.

In some aspects, the techniques described herein relate to a voltage discharge system, further including: a shunt resistor configured to measure an incoming current associated with the voltage discharge device.

In some aspects, the techniques described herein relate to a voltage discharge system, wherein the protective housing includes: an upper portion; a lower portion configured to support the voltage discharge device; a hinged portion joining the upper portion to the lower portion such that protective housing is selectively opened to access the voltage discharge device disposed therein; and a handle portion attached to one of the lower portion or the upper portion.

In some aspects, the techniques described herein relate to a voltage discharge system, wherein the voltage discharge device further includes one or more spacers protruding past the two or more Kelvin electrical connections of the plurality of electrical terminals.

In some aspects, the techniques described herein relate to a voltage discharge system, further including: a liquid crystal display (LCD) configured to provide a voltage indication and a current indication of the at least one energy storage module.

In some aspects, the techniques described herein relate to a voltage discharge system, further including: one or more input actuators configured to receive an operator input indicative of a voltage set point and a current setpoint.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
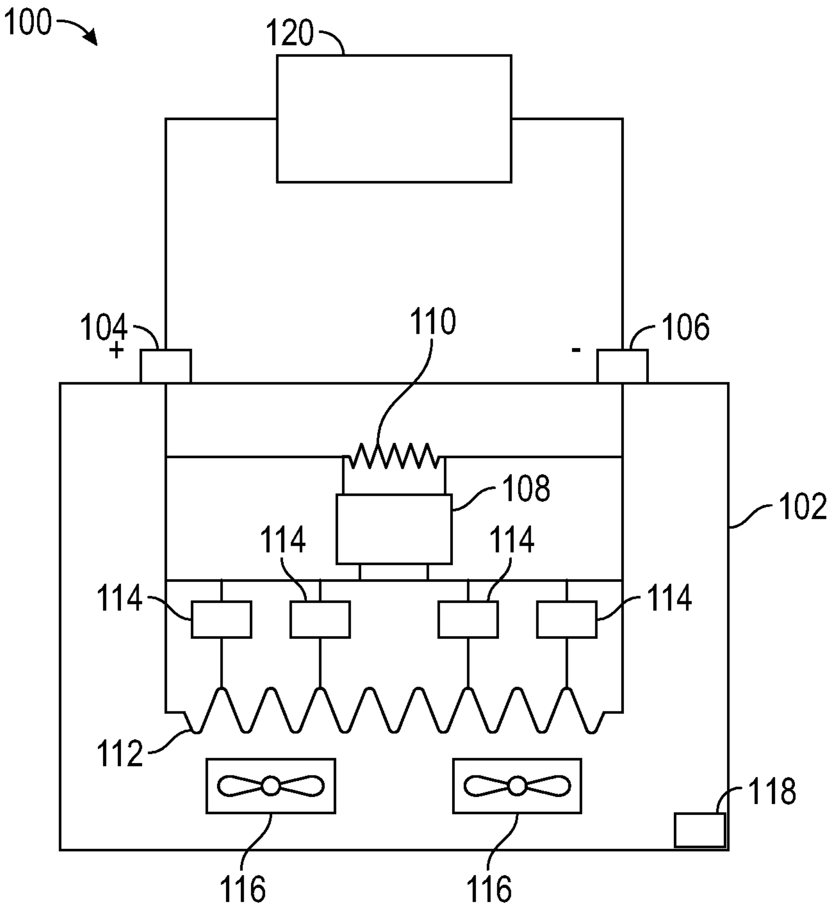
FIG. 1 illustrates an exemplary diagram of a system relating to some embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1 illustrates an exemplary diagram of a system 100 relating to some embodiments. In some embodiments, the system 100 comprises a voltage discharge device configured to reduce a voltage of at least one energy storage module 120. In some embodiments, the energy storage module 120 may be any type of energy storage device such as an ultracapacitor module or a battery. For example, in some embodiments, the system 100 comprises a voltage discharge device for draining a voltage of an ultracapacitor energy storage module comprising one or more ultracapacitors. In some embodiments, the system 100 comprises a housing 102, as shown. In some embodiments, the housing 102 comprises a covering or enclosure for the system 100. Alternatively, embodiments are contemplated in which the housing 102 may not be included.

In some embodiments, the system 100 comprises a set of electrical terminals including a positive electrical terminal 104 and a negative electrical terminal 106 configured to electrically couple the system 100 to an energy storage module. Further, in some embodiments, the system 100 comprises a controller 108, which may be a microcontroller, microprocessor, or other controller device. Additionally, in some embodiments, the system 100 comprises at least one shunt resistor 110, as shown. In some such embodiments, the shunt resistor 110 may be used to monitor an incoming current of the electrical terminals 104 and 106. In some embodiments, the controller 108 may be electrically and/or communicatively coupled to each of the positive electrical terminal 104, the negative electrical terminal 106, and the at least one shunt resistor 110.

In some embodiments, the system 100 further comprises a resistor coil 112 disposed in the housing 102. The resistor coil 112 may be electrically coupled to the electrical terminals 104 and 106. Accordingly, the resistor coil 112 may be configured to receive and drain energy from the energy storage module 120. As such, the resistor coil 112 may resist a current from the energy storage module 120 and expend energy from the energy storage module 120 as heat. In some embodiments, the system 100 further comprises one or more transistors 114, which may be field-effect transistors (FETs), disposed within the housing 102. In some such embodiments, the transistors 114 may be electrically coupled to the resistor coil 112 to selectably adjust a resistance of the resistor coil 112.

In some embodiments, the transistors 114 may be electrically coupled to the controller 108 such that the controller 108 may selectably control the transistors 114. Accordingly, embodiments are contemplated in which the resistance of the resistor coil 112 may be adjusted based on a measured voltage of the energy storage module 120. For example, a larger resistance may be applied to the energy storage module 120 while the voltage of the energy storage module 120 is higher and the resistance may be reduced as the voltage of the energy storage module 120 decreases via control of the transistors 114. In some embodiments, adjusting the resistance based on voltage allows the energy storage module 120 to be discharged optimally such that the overall drain time is reduced.

In some embodiments, the controller 108 may be configured to monitor one or more parameters of the energy storage module 120. For example, the controller 108 may monitor electrical parameters of the controller 108, such as, voltage, current, equivalent series resistance (ESR), and other suitable parameters. Further, in some embodiments, additional parameters may be estimated based on the monitored electrical parameters. For example, a remaining lifetime of the system 100 may be estimated based at least in part on the ESR. In some embodiments, a lifetime of the system 100 may be predicted during use while the energy storage module 120 is drained. Additionally, or alternatively, in some embodiments, a capacitance of the energy storage module 120 may be measured and the remaining lifetime may be further based on the measured capacitance.

In some embodiments, a voltage change may be monitored to determine a life of the energy storage module 120. For example, if the voltage drops more quickly than a standard voltage change, it may be determined that the energy storage module 120 has reached or is close to reaching the end of a useful life. Here, the shunt resistor 110 may be used to monitor a voltage change of the energy storage module 120. Accordingly, in some embodiments, a notification may be transmitted and/or presented to an operator in response to determining the remaining useful life of the energy storage module 120.

Additionally, embodiments are contemplated in which the system 100 comprises a plurality of resistor coils or a plurality of resistors. Further, embodiments are contemplated in which at least a portion of the system 100 may be passive. For example, one or more positive temperature coefficient thermistors may be included to passively adjust the resistance based on an internal temperature of the system 100 to thereby prevent overheating.

In some embodiments, the system 100 further comprises one or more fans 116 disposed on or within the housing 102. In some embodiments, the fans 116 may be electrically coupled to the electrical terminals 104 and 106 such that the fans 116 may receive electrical power from the energy storage module 120 being drained. In some embodiments, the fans 116 may be positioned and configured to increase airflow within the housing 102 to thereby cool the resistor coil 112 and/or other electronic components disposed within the housing 102. In some embodiments, the fans 116 prevent overheating of the system 100.

In some embodiments, the system 100 further comprises a wireless transceiver 118, as shown. The wireless transceiver 118 may be communicatively coupled to the controller 108 such that signals may be communicated with the controller 108, for example, including sending instructions to the controller 108 or receiving notification signals from the controller 108. In some such embodiments, the wireless transceiver 118 comprises a Bluetooth wireless radio frequency transceiver configured to receive and transmit Bluetooth signals with one or more user devices or with a server associated with a remote cloud-based data store. Alternatively, or additionally, the system 100 may include a wired communication connection for communicating with one or more user devices locally via a wired connection.

In some embodiments, said one or more user devices may comprise one of or combination of a mobile phone, a laptop or desktop computer, a tablet, or another form of suitable user device. Accordingly, an operator may receive updates and real time diagnostics associated with the system 100 such as a discharge level, testing status, or other information or parameters associated with the energy storage module 120. Further, in some embodiments, either of the wired or wireless communication connection described above may be used to transmit one or more commands to the controller 108 for initiating or stopping operation of the system 100. Alternatively, in some embodiments, said commands may be received locally by an input device integrated directly into the system 100, as will be described in further detail below. Further still, in some embodiments, the wired or wireless connection may be utilized to apply firmware updates to the system 100 such that the firmware updates may be downloaded wirelessly. Alternatively, or additionally, firmware updates may be installed via a wired connection such as through a USB communication port included on the system 100.

In some embodiments, the electrical terminals 104 and 106 comprise two or more Kelvin electrical connections configured to reduce or eliminate a contact resistance of the terminals while measuring a voltage or one or more other electrical parameters using the system. For example, in some embodiments, the Kelvin electrical connections are provided by providing two additional electrical terminals such that the system 100 comprises at least four distinct terminals. The system 100 may comprise a first set of electrical terminals including a positive terminal and a negative terminal and a second set of Kelvin electrical terminals including a positive Kelvin terminal and a negative Kelvin terminal that are distinct from the first set of electrical terminals. Accordingly, the first set of electrical terminals may be configured to conduct a high current while the set of Kelvin terminals are configured to conduct a low current and measure voltage.

Additionally, in some embodiments, the system 100 may further comprise a battery monitoring system (BMS) communicatively coupled to the controller 108. For example, a hookup port may be included such that data can be transmitted to the BMS prior to and during discharge of the energy storage module.

Figure 2:
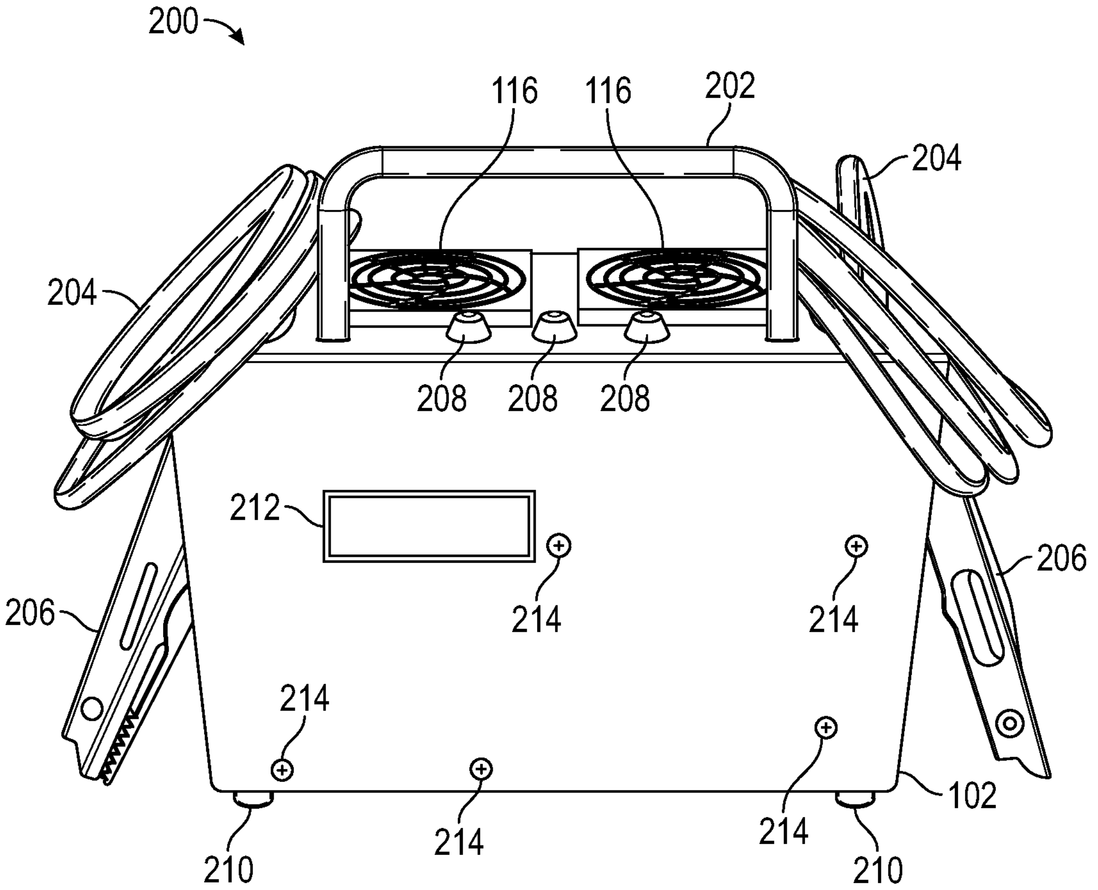
FIG. 2 illustrates an exemplary voltage discharge device relating to some embodiments of the present disclosure.

FIG. 2 illustrates an exemplary voltage discharge device 200 relating to some embodiments. In some embodiments, the exemplary voltage discharge device 200 comprises similar components as the system 100 described above. For example, the voltage discharge device 200 may include any of the housing 102, the electrical terminals 104 and 106, the controller 108, the at least one shunt resistor 110, the resistor coil 112, the transistors 114, and the fans 116. Further, in some embodiments, at least a portion of the components described herein may be included internally within the housing 102 such that these components are not externally visible.

In some embodiments, the resistor coil 112 comprises a tapped resistor such as a variable wire wound resistor with a sliding contact configured to selectively vary and regulate the voltage. Alternatively, or additionally, in some embodiments, the voltage may be varied and adjusted using the transistors 114 connected to the resistor coil 112. For example, a respective FET may be connected at each tap point of the tapped resistor such that the resistance may be dropped automatically responsive to a voltage level drop of the energy storage module 120. Here, the FETs may be configured to be switched based on the voltage of the energy storage module 120. Further, in some embodiments, the resistor coil 112 may comprise a nichrome material to thereby improve operability at high current and high temperature without damage to the resistor coil 112. In some such embodiments, the nichrome tapped resistor is configured to operate effectively while dissipating up to 700 to 800 Watts without damage or degradation. Alternatively, or additionally, in some embodiments, a heat sink may be included to draw heat from the resistor coil 112 to prevent overheating.

In some embodiments, the exemplary voltage discharge device 200 comprises a handle 202 disposed on an external surface of the housing 102. For example, in some embodiments, the handle 202 may be disposed on a top surface of the housing 102, as shown, for carrying and transporting the exemplary voltage discharge device 200. Additionally, embodiments are contemplated in which a plurality of handles are included. For example, in some embodiments, a handle may be disposed on each side of the housing 102.

In some embodiments, an electrical cable 204 may be disposed at each of the electrical terminals 104 and 106. Further, in some embodiments, a clamp 206 may be disposed on an end of each of the electrical cables 204. In some embodiments, the clamps 206 may be configured to secure the electrical cables 204 into an electrical connection with a terminal of the energy storage module 120. Additionally, or alternatively, other types of electrical connections are also contemplated such as bolt terminals, screw terminals, pin terminals, and plug terminals, as well as other suitable types of electrical connectors.

In some embodiments, one or more controls 208 may be disposed on an exterior surface of the housing 102, such as on a top surface of the housing 102, as shown. In some embodiments, the controls 208 may comprises actuatable buttons or other input means configured to interact with the exemplary voltage discharge device 200. For example, in some embodiments, the controls 208 may be operable to selectively activate or disable the exemplary voltage discharge device 200. Further, embodiments are contemplated in which the controls 208 are operable to adjust a mode or setting of the exemplary voltage discharge device 200.

In some embodiments, the fans 116 may be integrated into a top portion of the housing 102, as shown. Accordingly, the fans 116 may expel heat upwards out of an internal cavity of the exemplary voltage discharge device 200 to thereby cool the internal components of the exemplary voltage discharge device 200. In some embodiments, the fans 116 may be positioned adjacent to the resistor coil 112 and transistors 114 within the housing 102.

In some embodiments, one or more feet 210 may be disposed on a bottom surface of the housing 102, as shown. In some embodiments, the feet 210 may comprise a rigid material such as, for example, rubber or hard plastic to support the exemplary voltage discharge device 200 and prevent sliding or tipping of the exemplary voltage discharge device 200. Additionally, in some embodiments, a display 212 may be included on an external surface of the housing 102. For example, in some embodiments, the display 212 may be disposed on a front surface of the housing 102.

In some embodiments, the display 212 may include a digital LED display portion displaying a status and/or other information associated with the exemplary voltage discharge device 200. In some embodiments, a plurality of bolts 214 may be disposed in the housing 102 for securing the housing 102 in place and to support internal components. Further, in some embodiments, the bolts 214 may allow the housing 102 to be selectably opened to provide access to internal components, such as during maintenance operations. It should be understood that other types of fasteners may be used in place of or in addition to the bolts 214.

Figure 3A:
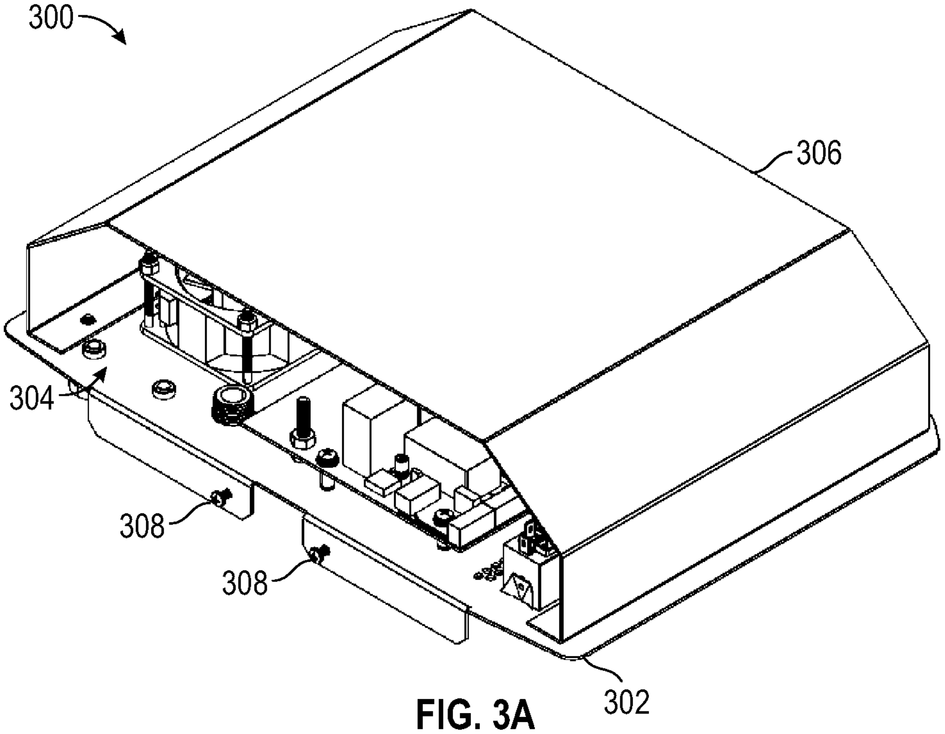
FIG. 3A illustrates an isometric view of an exemplary voltage discharge device relating to some embodiments of the present disclosure.

FIG. 3A illustrates an isometric view of an exemplary voltage discharge device 300 relating to some embodiments. In some embodiments, the voltage discharge device 300 comprises a varied layout compared to the voltage discharge device 200, as shown in FIG. 2. In some embodiments, the voltage discharge device 300 comprises back plate 302 with an internal portion 304 mounted thereon. In some embodiments, the voltage discharge device 300 further comprises a cover 306 disposed over the internal portion 304 of the voltage discharge device 300. In some embodiments, the cover 306 is operable to protect one or more electrical components disposed within the voltage discharge device 300. In some such embodiments, the cover 306 may be composed of aluminum, hard plastic, fiber glass, or another rigid material. In some embodiments, the voltage discharge device 300 further comprises one or more bolts 308 disposed on either of the back plate 302 or the cover 306 operable to mount the voltage discharge device 300. For example, in some embodiments, the voltage discharge device 300 may be mounted within a housing or within another suitable compartment. For example, in some embodiments, the voltage discharge device 300 may be configured to be disposed in a case and may be secured in place via the bolts 308.

Figure 3B:
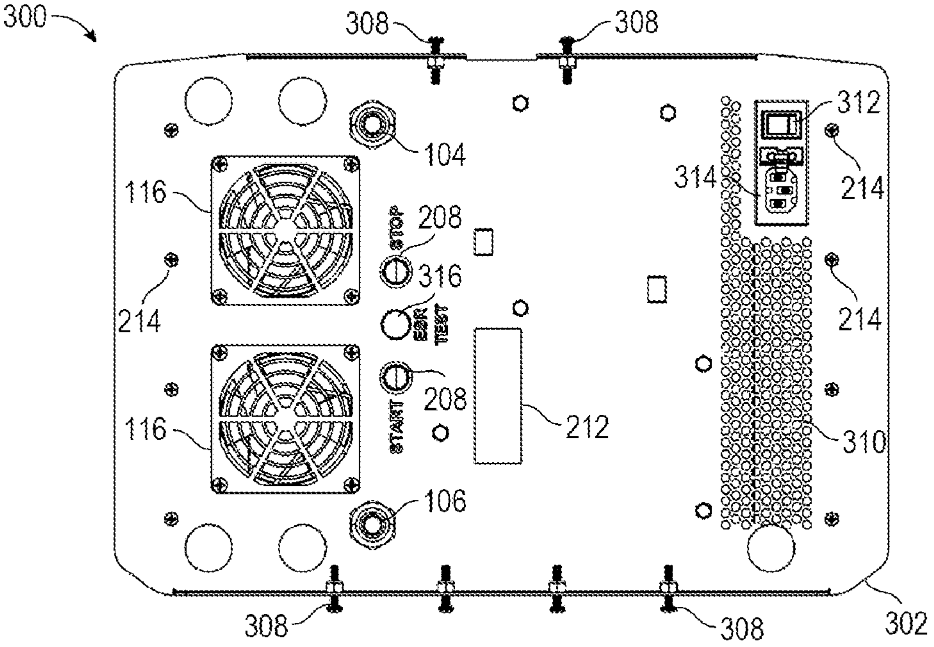
FIG. 3B illustrates a back side view of the exemplary voltage discharge device relating to some embodiments of the present disclosure.

FIG. 3B illustrates a back side view of the exemplary voltage discharge device 300 relating to some embodiments. In some embodiments, any of the electrical terminals 104 and 106, the fans 116, the controls 208, and the bolts 214 may be disposed on the back plate 302, as shown. In some embodiments, the back plate 302 comprises a plurality of ventilation holes 310 for providing air flow and ventilation to thereby dissipate heat from the voltage discharge device 300 into the surrounding environment. Further, in some embodiments, a power switch 312 and power port 314 may be disposed on the back plate 302, as shown.

In some embodiments, the power switch 312 is operable to selectably switch electrical power to the voltage discharge device 300 on and off. In some embodiments, the power port 314 may be operable to receive electrical power from a power source, such as a battery, separate capacitor, electrical generator, or an electrical grid, to power the voltage discharge device 300. However, it should be understood that, in some embodiments, the voltage discharge device 300 may receive electrical power from the energy storage module 120. Additionally, in some embodiments, the voltage discharge device 300 may receive power from either or both of the energy storage module 120 and an auxiliary power source. Further, in some embodiments, a power source may be included on or integrated into the voltage discharge device 300.

In some embodiments, the voltage discharge device 300 comprises at least one indicator 316. In some embodiments, the indicator 316 comprises one or more LEDs. Further, in some embodiments, the indicator 316 includes an equivalent series resistance (ESR) test indicator configured to indicate an ESR of the voltage discharge device 300. For example, one or more LEDs may be adjusted based on a measured ESR of the voltage discharge device 300 or of the energy storage module 120 coupled to the voltage discharge device 300. In one example, a green LED light may be activated if the ESR is within an acceptable range and a red LED light may be activated if the ESR is outside of the acceptable range.

Figure 3C:
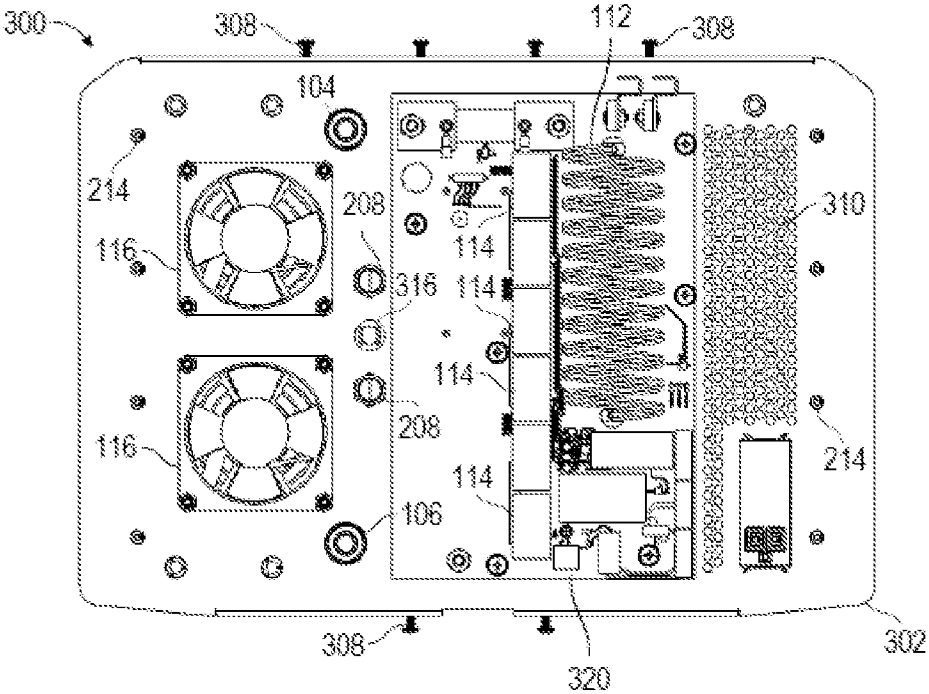
FIG. 3C illustrates an internal view of the exemplary voltage discharge device relating to some embodiments of the present disclosure.

FIG. 3C illustrates an internal view of the exemplary voltage discharge device 300 relating to some embodiments. In some embodiments, a circuit board 320 may be included disposed within the internal portion 304 of the voltage discharge device 300. In some such embodiments, the resistor coil 112 and the transistors 114 may be disposed on the circuit board 320, as shown. In some such embodiments, the transistors 114 may be electrically coupled to the resistor coil 112 to selectably vary the resistance of the resistor coil 112. Accordingly, the resistance may be automatically varied based on one or more measured parameters of the voltage discharge device 300 or of the energy storage module 120. The circuit board 320 may be bolted directly onto the back plate 302 of the voltage discharge device 300.

In some embodiments, the voltage discharge device 300 may be used to drain electrical energy from the energy storage module 120, such as a battery, an ultracapacitor, or another suitable electrical energy storage device. In some such embodiments, the voltage discharge device 300 is operable to completely drain a voltage from the energy storage module 120 or to drain at least a portion of the voltage. For example, embodiments are contemplated in which the voltage discharge device 300 is operable to discharge the energy storage module 120 to 0 volts or near 0 volts such that maintenance operations can be safely performed in the environment of the energy storage module 120. In some such embodiments, the 300 is operable to drain the voltage of the energy storage module 120 in about 3 minutes or less. Accordingly, down time prior to performing maintenance in the environment of the energy storage module 120 is effectively reduced.

It should be understood that extensive amounts of heat may be generated through the voltage draining process of the voltage discharge device 300. Specifically, the resistor coil 112 may dissipate voltage into large amounts of heat through resistive electrical heating. Accordingly, the fans 116 and the ventilation holes 310 may be configured to cool the resistor coil 112. Additionally, the fans 116 and the ventilation holes 310 may cool the transistors 114 disposed adjacent to the resistor coil 112, which may be especially sensitive to heat damage. In some embodiments, additional electronic components may be incorporated into the circuit board 320 or into the voltage discharge device 300. For example, in some embodiments, one or more internal temperature sensors may be disposed within the voltage discharge device 300 to monitor an internal temperature of the 300. Accordingly, in some such embodiments, the fans 116 may be controlled based at least in part on the temperature or a notification may be transmitted to an operator indicative of an unsafe heating event.

Embodiments are contemplated in which the transistors 114 may be pulsed to further reduce heating of the transistors 114. Accordingly, current may be directed to only a portion of the transistors 114 at a time such that the transistors 114 are not all activated simultaneously. Further, in some embodiments, a plurality of temperature sensors may be included disposed adjacent to respective transistors 114. Accordingly, if it is determined that a particular transistor is above a temperature threshold, current may be diverted to one or more other transistors to allow the particular transistor to cool. In some embodiments, pulse control of the transistors 114 may be carried out using the controller 108.

In some embodiments, the resistor coil 112 may be selected based at least in part on a maximum operating current of the voltage discharge device 300. For example, in some embodiments, a resistor coil operable for a maximum current of 60 amps may be used. Alternatively, a larger resistor coil or a larger number of resistor coils may be included to reach a maximum current of 100 amps. However, it should be understood that resistor coils may be selected to achieve other maximum operating currents not explicitly described herein.

Figure 4:
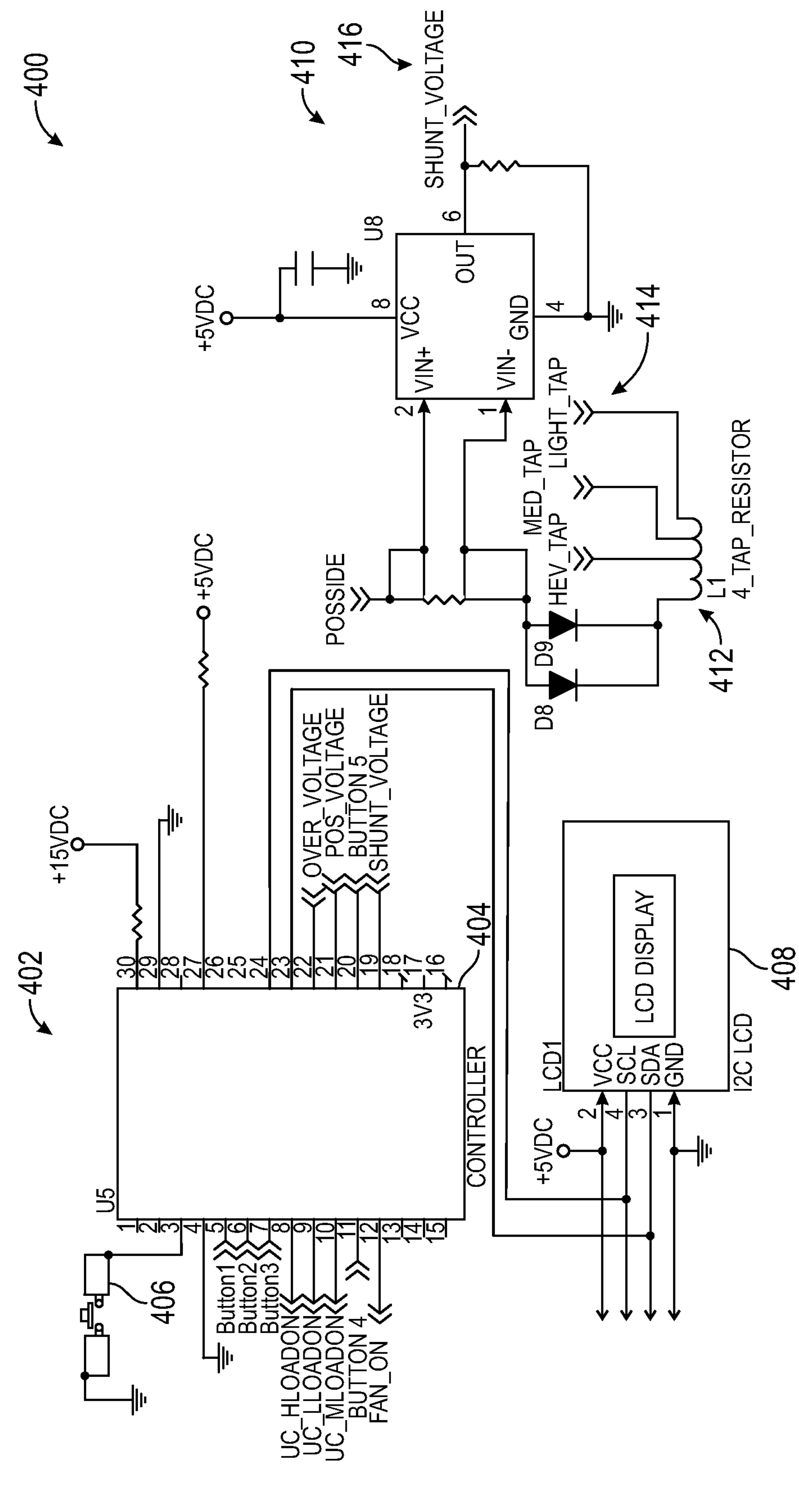
FIG. 4 illustrates an exemplary electrical circuit relating to some embodiments of the present disclosure.

FIG. 4 illustrates an exemplary electrical circuit 400 relating to some embodiments. In some embodiments, the electrical circuit 400 may be incorporated into any of the voltage discharge device 200 or the voltage discharge device 300. For example, in some embodiments, the electrical circuit 400 may be incorporated onto the circuit board 320 of the voltage discharge device 300. In some embodiments, the electrical circuit 400 comprises a control portion 402, as shown. The control portion 402 may include a microcontroller 404 with a plurality of input and output channels.

In some embodiments, the control portion 402 comprises at least one control switch 406 coupled to the microcontroller 404. In some embodiments, the control portion 402 further comprises at least one Liquid Crystal Display (LCD) 408 coupled to the microcontroller 404. In some such embodiments, the LCD 408 may be the display 212, as described above, configured to display information associated with the voltage discharge device 300. For example, in some embodiments, information from the microcontroller 404 may be transmitted to the LCD 408 to display said information to an operator.

Additionally, in some embodiments, the electrical circuit 400 further comprises a resistor tap portion 410. In some embodiments, the resistor tap portion 410 includes a multitap resistor 412 coupled to a series of resistor taps 414, as shown. In some such embodiments, the multitap resistor 412 may comprise a resistor coil such as the resistor coil 112. Further, each of the series of resistor taps 414 may be coupled to a respective transistor of the one or more transistors 114. For example, in some embodiments, the resistor taps 414 may be electrically coupled to the multitap resistor 412 along the length of the multitap resistor 412 such that the resistance of the multitap resistor 412 may be selectively varied.

In some embodiments, the resistor tap portion 410 further comprises at least one shunt voltage node 416. Here, the shunt voltage node 416 may be coupled to a shunt resistor disposed in the electrical circuit 400 operable to measure an incoming current from the energy storage module 120. For example, the shunt voltage node 416 may provide a low-resistance path for the current to pass through.

It should be understood that, in some embodiments, any number of additional circuit portions may be included in the electrical circuit 400. Further, the various portions of the electrical circuit 400 may be electrically coupled and connected. For example, the control portion 402 may be communicatively coupled to the resistor tap portion 410. In some such embodiments, the microcontroller 404 may be coupled to the transistors 114 to thereby control operation of the multitap resistor 412 via the series of resistor taps 414. For example, the microcontroller 404 may selectably activate and deactivate the transistors to thereby control a portion of the multitap resistor 412 that is active. In some embodiments, a voltage divider circuit portion may be included to feedback into the microcontroller 404. Additionally, in some embodiments, a closed-loop current monitoring circuit portion may be included within the electrical circuit 400 to monitor the incoming current from the energy storage module 120.

Additionally, or alternatively, in some embodiments, one or more insulated-gate bipolar transistors (IGBTs) may be included within the electrical circuit 400 to thereby selectively control the resistance of the voltage discharge device 300. In some such embodiments, the IGBT may be used in place of the multitap resistor 412 and allows the voltage discharge device 300 to be adapted for larger currents to thereby drain relatively larger stored voltages from energy storage devices. For example, incorporation of the IGBT may increase the maximum operating current associated with the voltage discharge device 300 up to and above 100 amps.

Figure 5:
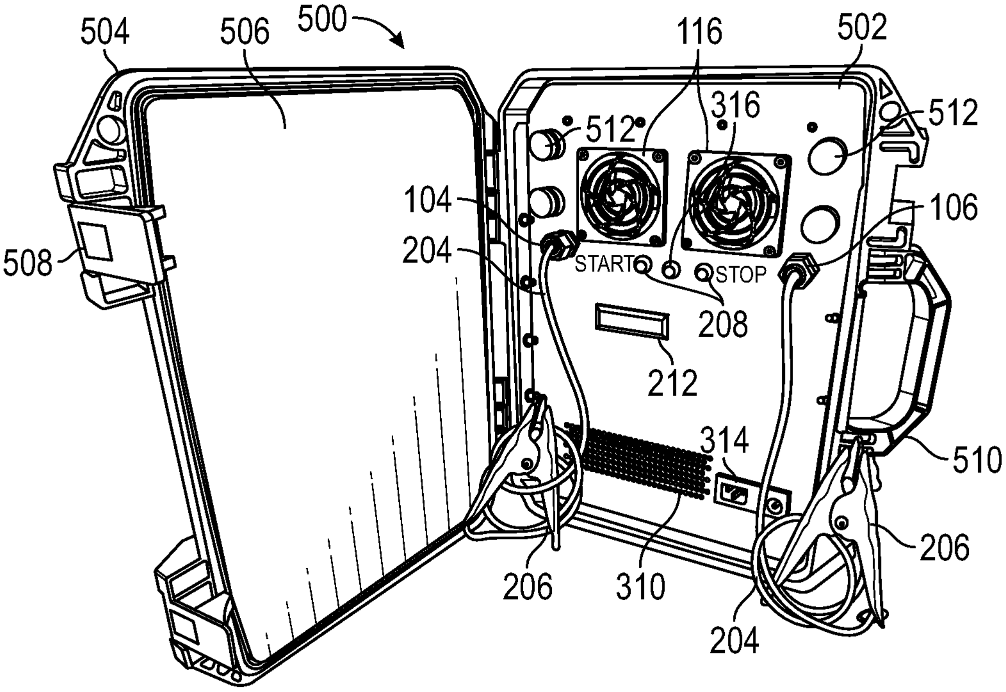
FIG. 5 illustrates an exemplary voltage discharge system relating to some embodiments of the present disclosure.

FIG. 5 illustrates an exemplary voltage discharge system 500 relating to some embodiments of the present disclosure. The voltage discharge system 500 comprises another configuration of a voltage discharge device 502, which may be similar to the voltage discharge device 200 or system 100, as described above. For example, the voltage discharge device 502 may include any of the components described above such as, the fans 116, the electrical terminals 104, the electrical terminals 106, the electrical cables 204, clamp 206, controls 208, the ventilation holes 310, the power port 314, the indicator 316, or other components not explicitly described herein. In some embodiments, the cables 204 and clamps 206 comprise jumper cables with Kelvin connections to provide accurate voltage measurements.

In some embodiments, the voltage discharge system 500 further comprises a protective housing 504. The protective housing 504 may comprise a protective rigid material such as metal, hard plastic, or another rigid and durable material to protect the components disposed therein.

In some embodiments, the protective housing 504 comprises a rigid protective case including a lower portion configured to receive the voltage discharge device 502 and an upper portion joined to the lower portion via a hinged portion such that the case may be selectively opened to access the voltage discharge device 502. The protective housing 504 may comprise a cushion 506 comprising a soft material such as foam, fabric, or another suitable cushioning material for protecting the voltage discharge device 502. Further, in some embodiments, the protective housing 504 includes a locking portion 508 configured to selectively lock the protective housing 504 in a closed position. For example, the locking portion 508 may comprise a clip disposed on the upper portion of the case that is configured to lock around a clip receiving recess disposed on the lower portion of the case to prevent unintentional opening of the case.

In some embodiments, the protective housing 504 comprises at least one handle 510 configured to be held by a user during transport of the voltage discharge system 500. For example, in some embodiments, the handle 510 is integrated into a portion of either or both of the lower portion or the upper portion of the case. Further, embodiments are contemplated in which the protective housing 504 is configured to be water tight to prevent water damage to electronic components of the voltage discharge device 502. For example, the protective housing 504, when in a closed position, may be configured to provide a pressure seal to prevent transfer of water or other fluids.

In some embodiments, the voltage discharge device 502 further comprises one or more spacers 512 disposed on an outer surface of the voltage discharge device 502 that protrude past two or more Kelvin electrical connections of the plurality of electrical terminals of the voltage discharge device 502. Accordingly, the spacers 512 may be configured to press against an inner surface of the protective housing 504 while the protective housing 504 is in the closed position to prevent damage or stress to the components of the voltage discharge device 502 such as the electrical terminals 104 and 106.

Figure 6:
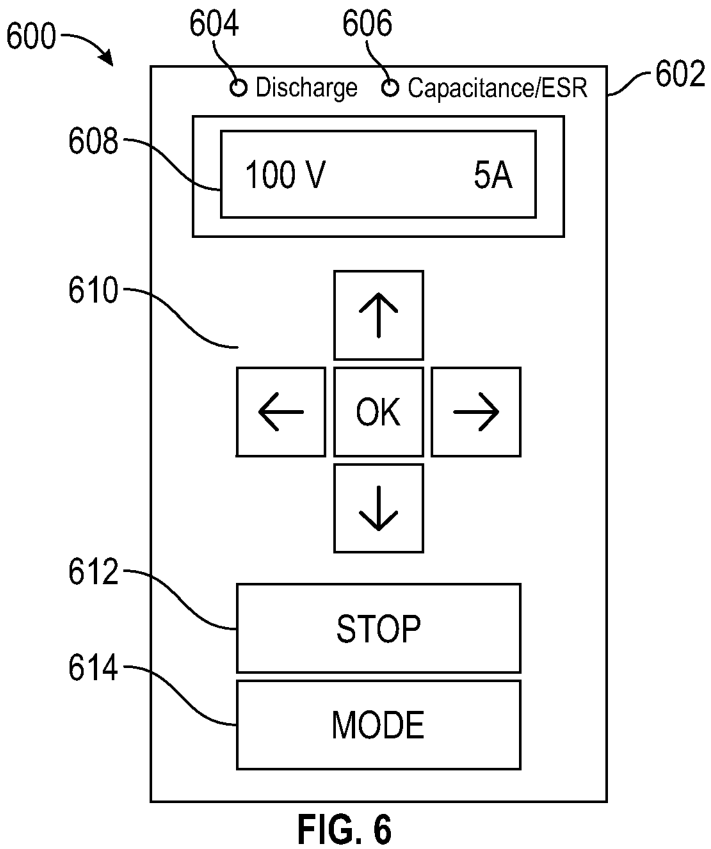
FIG. 6 illustrates an exemplary user interface relating to some embodiments of the present disclosure.

FIG. 6 illustrates an exemplary user interface 600 relating to some embodiments of the present disclosure. In some embodiments, the user interface 600 may be disposed in any of the system 100, the voltage discharge device 200, the voltage discharge device 300, or the voltage discharge system 500. Alternatively, or additionally, in some embodiments, the user interface 600 may be disposed on a portion of the protective housing 504. Further, in some embodiments, the user interface 600 may be displayed or generated remotely and separate from the system 100. For example, the user interface 600 may be generated for display on a display element of a user device such as a mobile phone, tablet, or desktop or laptop computer of an operator.

In some embodiments, the user interface 600 comprises a membrane interface 602 comprising a touch sensitive membrane. In some embodiments, one or more indicators may be included on the user interface 600 such as a discharge indicator 604 and a measurement indicator 606, as shown. In some embodiments, each of the discharge indicator 604 and the measurement indicator 606 comprise an LED or another suitable illumination mechanism configured to selectively illuminate based on a status or current mode of operation of the voltage discharge device. For example, the discharge indicator 604 may be configured to illuminate while the device is being used to discharge one or more energy storage modules and the measurement indicator 606 may be configured to illuminate while the voltage discharge device is being used to measure a capacitance or ESR of the one or more energy storage modules.

The user interface 600 may comprise a display portion 608 configured to display information associated with the voltage discharge device, such as a voltage and current of the energy storage module measured by the voltage discharge device. In some embodiments, the display portion 608 comprises an LCD screen integrated into the membrane interface 602, as shown. In some embodiments, the display portion 608 is further configured to display one or more set points or target parameters of the voltage discharge device.

In some embodiments, one or more input actuators 610 are included with the user interface 600. For example, one or more membrane switch buttons disposed on the membrane interface 602. In some embodiments, the membrane switch buttons comprise a plurality of directional inputs and a select or 'OK' input. Further, in some embodiments, the input actuators 610 further comprise a stop input actuator 612 and a mode input actuator 614. For example, the stop input actuator 612 may comprise a membrane switch button operable to halt one or more operations of the voltage discharge device and the mode input actuator 614 may comprise a membrane switch button operable to adjust or ascertain a mode of the voltage discharge device.

Figure 7:
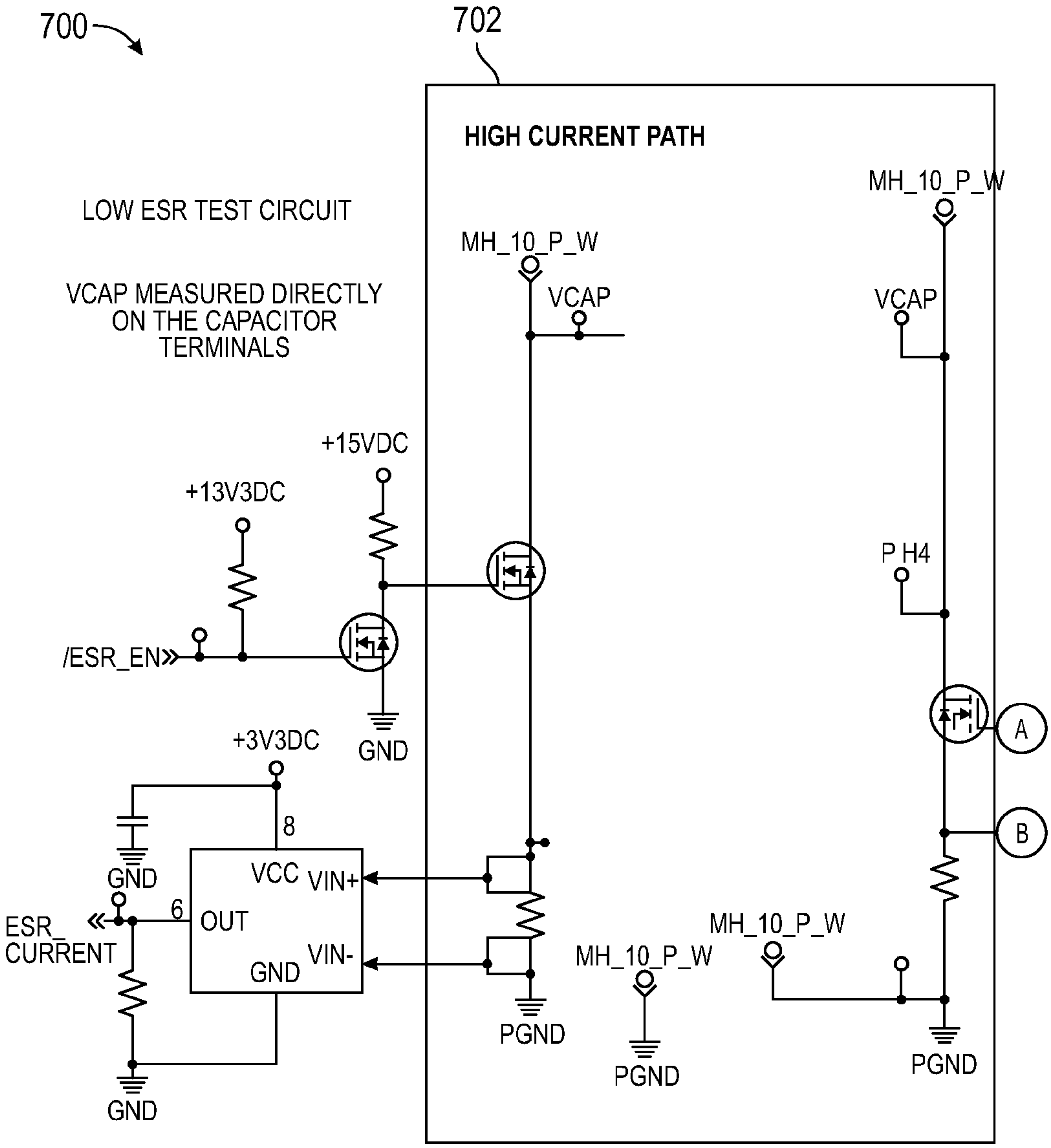
FIG. 7 illustrates an exemplary circuit relating to some embodiments of the present disclosure.
Figure 7:
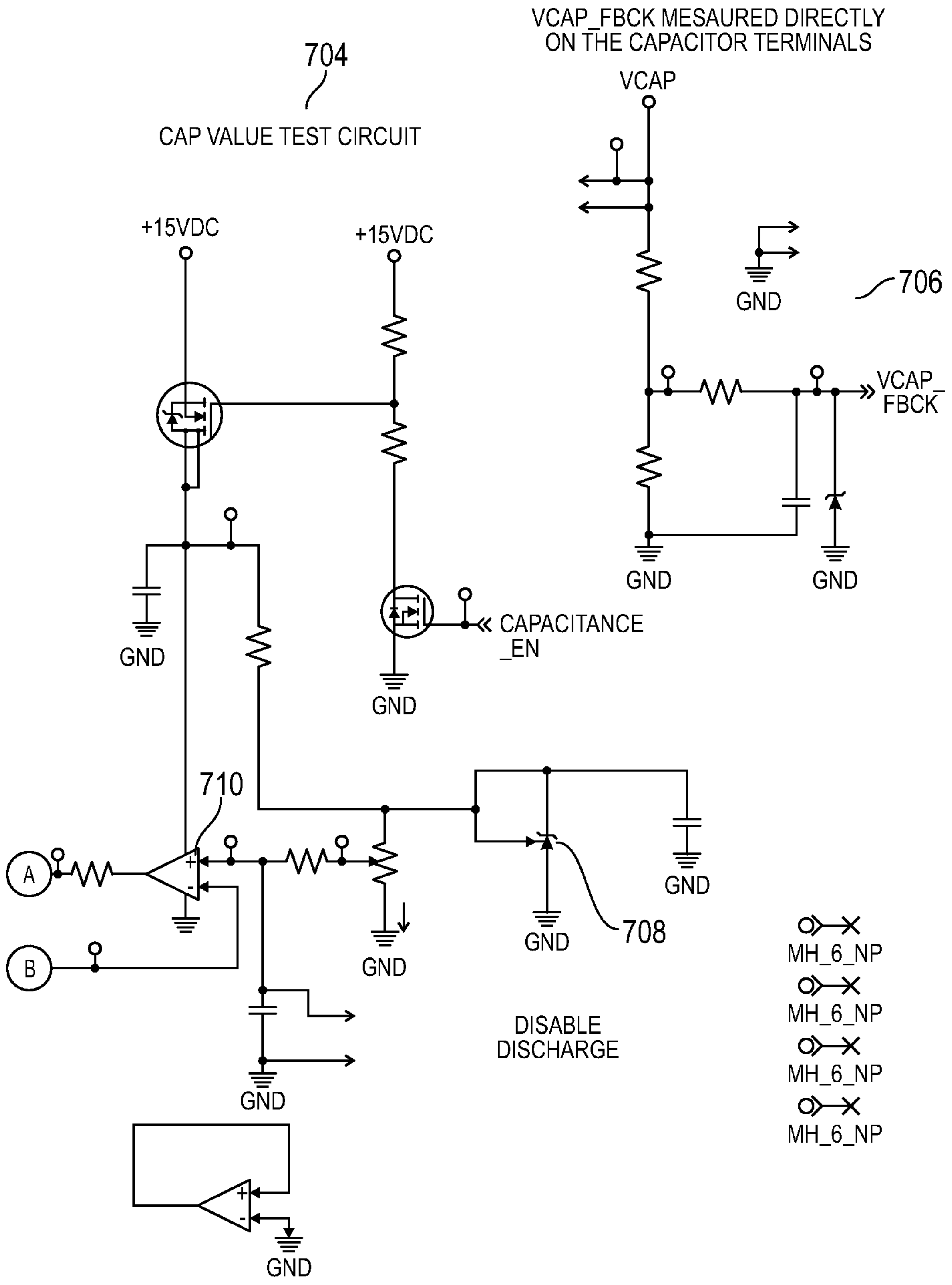

FIG. 7 illustrates an exemplary circuit 700 relating to some embodiments of the present disclosure. The circuit 700 comprises an ESR test portion 702, as shown, including a high current path in which a voltage is read measured directly from the capacitor terminals. The ESR test portion 702 may be used to measure an ESR of the energy storage device. Additionally, the circuit 700 may include a capacitance test portion 704, as shown, configured to provide a capacitance measurement from the energy storage device. Further, in some embodiments, the circuit 700 comprises a voltage feedback portion 706, which may be coupled directly to ultracapacitor terminals of the energy storage module. Further still, in some embodiments, a precision resistor 708 may be included for providing a precise resistance to aid in the capacitance measurement. In some embodiments, one or more operational amplifiers 710 may be included within the circuit 700.

Figure 8:
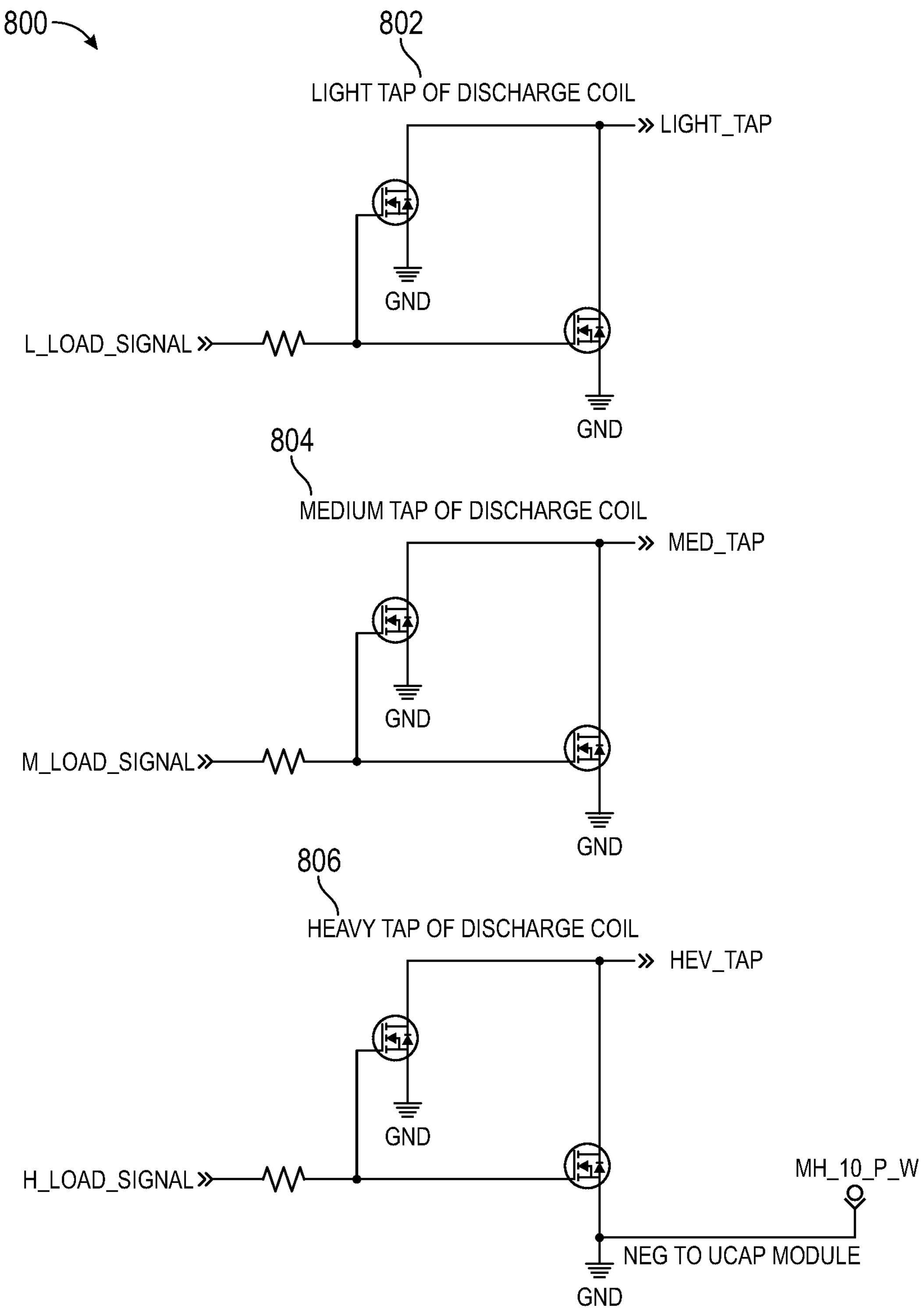
FIG. 8 illustrates an exemplary circuit relating to some embodiments of the present disclosure.
Figure 8:
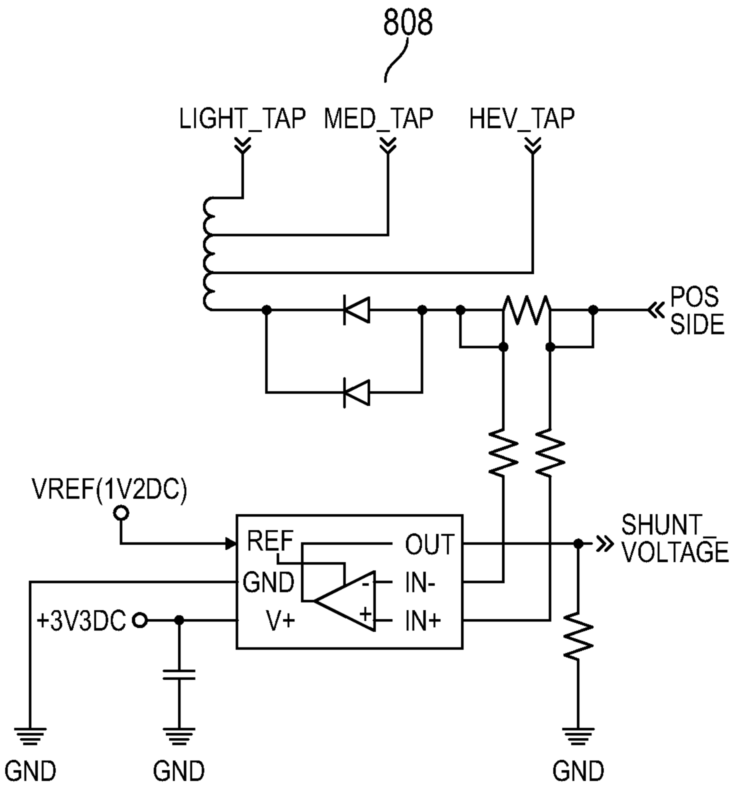

FIG. 8 illustrates an exemplary circuit 800 relating to some embodiments of the present disclosure. In some embodiments, the circuit 800 may include a plurality of tap portions such as a light tap portion 802, a medium tap portion 804, and a heavy tap portion 806, as shown. Each of the tap portions may be operationally coupled to a tapped resistor portion 808 comprising the resistor coil 112, as described above. Accordingly, the tapped resistor portion 808 may be configured to provide a varied resistance depending on which of the tap portions are currently activated. In some such embodiments, activation of the tap portions may be determined passively or actively based at least in part on a current voltage from the energy storage module. For example, the heavy tap portion 806 may be configured to receive a discharge load while the voltage is at a high level, the medium tap portion 804 may be configured to receive a discharge load while the voltage is at a medium level, and the light tap portion 802 may be configured to receive a discharge load while the voltage is at a low level.

Figure 9:
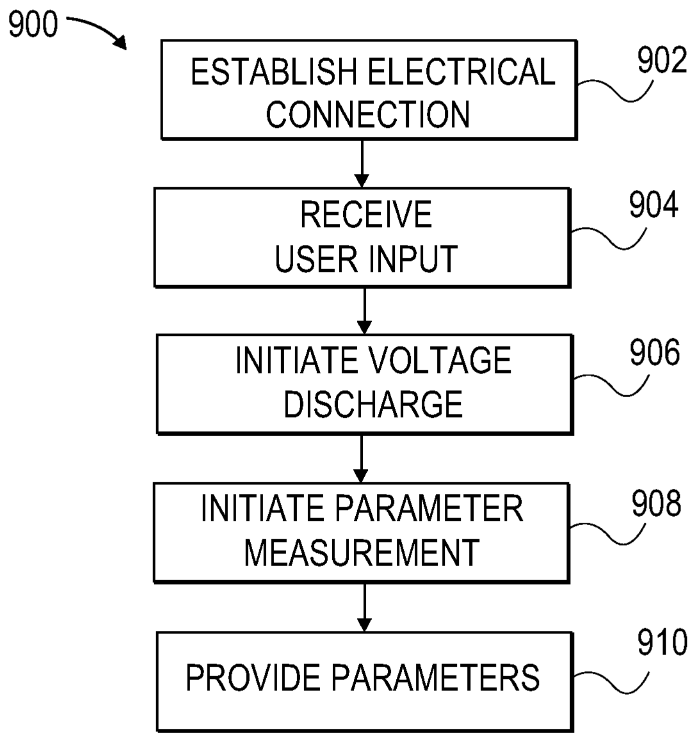
FIG. 9 illustrates an exemplary method for monitoring and reducing a voltage of at least one energy storage module using a voltage discharge device relating to some embodiments.

FIG. 9 illustrates an exemplary method 900 for monitoring and reducing a voltage of at least one energy storage module using a voltage discharge device relating to some embodiments. In some embodiments, at least a portion of the method 900 may be performed by the voltage discharge device. For example, at least one step may be performed by executing a set of computer-readable instructions on at least one processor disposed in a control portion of the voltage discharge device. Accordingly, the controller or at least one processor associated therewith may be programmed perform any portion of the steps described herein based on the computer-readable instructions. Alternatively, or additionally, in some embodiments, at least a portion of the method 900 may be performed remotely or externally on one or more external devices. Further, in some embodiments, one or more steps may be performed at least in part by an operator using the voltage discharge device. Further still, in some embodiments, instructions for performing the method 900 may be included and associated with the voltage discharge device.

At step 902, an electrical connection is established between the voltage discharge device and the energy storage module (or plurality of energy storage modules), such as an ultracapacitor energy storage module. In some embodiments, the electrical connection is established using one or more electrical ports such as the electrical terminals 104 and 106. For example, in some embodiments, the clamp 206 of the positive terminal 104 is attached to a positive terminal of the energy storage module and the clamp 206 of the negative terminal 106 is attached to a negative terminal of the energy storage module.

At step 904, user input is received. In some embodiments, one or more user inputs are received via a user interface or one or more other input devices associated with the voltage discharge device. In some embodiments, the user input comprises a voltage setpoint and/or a current setpoint for a discharge operation.

At step 906, a voltage discharge operation is initiated on the voltage discharge device. In some embodiments, the voltage discharge operation comprises drawing voltage from the energy storage module using the established electrical connection. Further, in some embodiments, the voltage discharge operation may be performed at a constant current to thereby reduce an overall time to complete the voltage discharge operation. For example, a Proportional-Integral-Derivative (PID) control loop may be included to maintain the constant current during the discharge operation. In some such embodiments, the PID control loop may be employed using one or more computer-readable software instructions stored on or communicated to the controller/processor of the voltage discharge device 502.

Embodiments are contemplated in which the voltage discharge device may be configured to operate as an auxiliary heating device during the discharge operation. For example, heat generated through the electrical discharge may be used to heat an internal compartment or another environment associated with the voltage discharge device. As an example, the voltage discharge device may be configured to heat an internal compartment of a wind turbine while discharging an ultracapacitor module or another energy storage module disposed in the wind turbine.

At step 908, a measurement operation of one or more electrical parameters of the energy storage module using the voltage discharge device is initiated. In some embodiments, the measurement operation is initiated automatically responsive to a voltage of the energy storage module. For example, the measurement operation may be initiated responsive to determining that the voltage of the energy storage module has dropped below a predetermined threshold voltage, such as, for example, 10 volts, 8 volts, 5 volts, 4 volts, or another suitable voltage threshold. In some embodiments, the measurement operation measures any one of or combination of parameters such as, an ESR, a capacitance, a voltage, a current, or another suitable parameter associated with the energy storage module.

In some embodiments, a capacitance measurement may be completed by measuring a voltage drop over a set resistance and calculating the capacitance based on a time taken to discharge. Here, the energy storage module 120 may be discharged to a low voltage prior to the test. For example, the energy storage module 120 may be discharged to at or below 10 volts or 4 volts prior to the capacitance measurement. Further, in some embodiments, an Operational Amplifier (op amp) may be included to drive a constant current through a precision resistor such that a microcontroller of the voltage discharge device is able to accurately calculate the capacitance.

In some embodiments, an ESR measurement is completed by measuring a current from a precision current shunt disposed within an electrical circuit of the voltage discharge device from a known voltage point over a dead short, as well as a voltage drop. In some embodiments, the resistance associated with the ESR measurement is approximately 1 milliohm plus an additional cable resistance that is known for the voltage discharge device.

At step 910, one or more parameters from the measurement operation are provided. The parameters may be provided to a user or operator using any suitable notification or display mechanism, such as, for example, using the LCD 408 described above or another audible or visual notification device. In some embodiments, additional measurements calculated by the processor or controller may also be communicated to the operator. For example, an estimated remaining lifetime may be determined based on the one or more parameters and a notification indicative of the remaining lifetime may be transmitted to the operator in real time.

It should be understood that embodiments are contemplated of a voltage discharge device or system that includes any combination of the features and components described above with respect to the system 100, the exemplary voltage discharge device 200, the voltage discharge device 300, and the voltage discharge system 500.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A voltage discharge device for reducing a voltage of at least one ultracapacitor energy storage module, the voltage discharge device comprising:

a controller configured to monitor an equivalent series resistance (ESR) of the at least one ultracapacitor energy storage module to thereby determine a life of the at least one ultracapacitor energy storage module;

a plurality of electrical terminals electrically coupled to the at least one ultracapacitor energy storage module, the plurality of electrical terminals comprising two or more Kelvin electrical connections configured to reduce contact resistance while measuring voltage;

a shunt resistor configured to measure an incoming current associated with the voltage discharge device;

a resistor coil electrically coupled to at least a portion of the plurality of electrical terminals; and one or more field-effect transistors selectively electrically coupled to the resistor coil to thereby selectively adjust a resistance of the resistor coil based on a voltage of the at least one ultracapacitor energy storage module.

2. The voltage discharge device of claim 1, further comprising:

a positive electrical cable attached to a positive electrical terminal of the plurality of electrical terminals, the positive electrical cable configured to electrically couple the positive electrical terminal to the at least one ultracapacitor energy storage module; and a negative electrical cable attached to a negative electrical terminal of the plurality of electrical terminals, the negative electrical cable configured to electrically couple the negative electrical terminal to the at least one ultracapacitor energy storage module.

3. The voltage discharge device of claim 1, further comprising:

one or more fans configured to cool the resistor coil during use, wherein the one or more fans are electrically powered by the voltage of the at least one ultracapacitor energy storage module.

4. The voltage discharge device of claim 1, further comprising:

a voltage divider circuit configured to feedback to the controller to thereby monitor the voltage of the at least one ultracapacitor energy storage module.

5. The voltage discharge device of claim 1, further comprising:

a Bluetooth microcontroller configured to wirelessly communicate with one or more external devices.

6. The voltage discharge device of claim 5, wherein the voltage discharge device is configured to reduce a voltage of the at least one ultracapacitor energy storage module to below 5 volts prior to measuring the ESR of the at least one ultracapacitor energy storage module.

7. The voltage discharge device of claim 1, wherein the voltage discharge device is configured to be coupled to at least one external power source distinct from the at least one ultracapacitor energy storage module.

8. A voltage discharge device for reducing a voltage of at least one energy storage module, the voltage discharge device comprising:

a controller configured to monitor an equivalent series resistance (ESR) of the at least one energy storage module to thereby determine a life of the at least one energy storage module;

a plurality of electrical terminals electrically coupled to the at least one energy storage module, the plurality of electrical terminals comprising two or more Kelvin electrical connections configured to reduce contact resistance while measuring voltage;

a shunt resistor configured to measure an incoming current associated with the voltage discharge device;

a resistor coil electrically coupled to at least a portion of the plurality of electrical terminals; and one or more field-effect transistors selectively electrically coupled to the resistor coil to thereby selectively adjust a resistance of the resistor coil based on a voltage of the at least one energy storage module.

9. The voltage discharge device of claim 8, further comprising:

a user interface unit comprising:

a display; and one or more input actuators.

10. The voltage discharge device of claim 9, wherein the one or more input actuators are configured to receive a user input indicative of a voltage set point and a current set point from a user.

11. The voltage discharge device of claim 10, wherein the controller is programmed to update a voltage and current of the voltage discharge device based on the user input.

12. The voltage discharge device of claim 8, wherein the controller is programmed to perform a discharge operation in which a voltage of the at least one energy storage module is discharged below a predetermined voltage threshold.

13. The voltage discharge device of claim 12, wherein the controller is further programmed to perform a measurement operation in which one or more parameters associated with the at least one energy storage module are measured after the discharge operation.

14. The voltage discharge device of claim 8, wherein the voltage discharge device is configured to reduce a voltage of the at least one energy storage module to below 5 volts prior to measuring the ESR of the at least one energy storage module.

15. A voltage discharge system comprising:

a protective housing; and a voltage discharge device disposed in the protective housing and configured to be coupled to at least one energy storage module for monitoring the at least one energy storage module, the voltage discharge device comprising:

a controller configured to monitor an equivalent series resistance (ESR) of the at least one energy storage module to thereby determine a life of the at least one energy storage module;

a plurality of electrical terminals electrically coupled to the at least one energy storage module, the plurality of electrical terminals comprising two or more Kelvin electrical connections configured to reduce contact resistance while measuring voltage;

a resistor coil electrically coupled to at least a portion of the plurality of electrical terminals; and one or more field-effect transistors selectively electrically coupled to the resistor coil to thereby selectively adjust a resistance of the resistor coil based on a voltage of the at least one energy storage module.

16. The voltage discharge system of claim 15, further comprising:

a shunt resistor configured to measure an incoming current associated with the voltage discharge device.

17. The voltage discharge system of claim 15, wherein the protective housing comprises:

an upper portion;

a lower portion configured to support the voltage discharge device;

a hinged portion joining the upper portion to the lower portion such that protective housing is selectively opened to access the voltage discharge device disposed therein; and a handle portion attached to one of the lower portion or the upper portion.

18. The voltage discharge system of claim 17, wherein the voltage discharge device further comprises one or more spacers protruding past the two or more Kelvin electrical connections of the plurality of electrical terminals.

19. The voltage discharge system of claim 15, further comprising:

a liquid crystal display (LCD) configured to provide a voltage indication and a current indication of the at least one energy storage module.

20. The voltage discharge system of claim 19, further comprising:

one or more input actuators configured to receive an operator input indicative of a voltage set point and a current setpoint.

* * * * *